United States Patent [19]
Manzi et al.

[11] Patent Number: 5,871,080
[45] Date of Patent: Feb. 16, 1999

[54] PRODUCT ALIGNING SYSTEM

[75] Inventors: Mark A. Manzi; William L. Harrison; James M. Phelps; Darryl T. Phillips, all of Cincinnati, Ohio

[73] Assignee: Planet Products Corporation, Cincinnati, Ohio

[21] Appl. No.: 531,427

[22] Filed: Sep. 21, 1995

[51] Int. Cl.⁶ .................................................. B65G 47/14
[52] U.S. Cl. .......................... 198/396; 198/382; 198/455
[58] Field of Search .................................. 198/382, 396, 198/394, 415, 455, 432, 622

[56] References Cited

U.S. PATENT DOCUMENTS

| | | | |
|---|---|---|---|
| 586,866 | 7/1897 | Potter . | |
| 700,308 | 5/1902 | Dodge . | |
| 1,341,238 | 5/1920 | Mason . | |
| 1,513,765 | 11/1924 | Smith . | |
| 1,616,101 | 2/1927 | Ackley . | |
| 1,754,047 | 4/1930 | Reaves . | |
| 2,126,240 | 8/1938 | Bergh | 198/201 |
| 2,637,433 | 5/1953 | Shuttleworth | 198/33 |
| 2,701,049 | 2/1955 | Kendall et al. | 198/127 |
| 2,896,773 | 7/1959 | Syce | 198/201 |
| 3,068,989 | 12/1962 | Packman et al. | 198/382 |
| 3,075,630 | 1/1963 | Fisk | 198/76 |
| 3,464,538 | 9/1969 | Hartmann | 198/201 |
| 3,485,339 | 12/1969 | Miller et al. | 198/34 |
| 3,556,281 | 1/1971 | Margaroli et al. | 198/455 |
| 3,630,340 | 12/1971 | Bouzat et al. | 198/201 |
| 3,724,646 | 4/1973 | Kornylak | 198/201 |
| 4,387,801 | 6/1983 | Hoover | 198/821 |
| 4,440,287 | 4/1984 | Lund et al. | 198/382 |
| 4,485,912 | 12/1984 | Carmichael et al. | 198/382 |
| 4,640,408 | 2/1987 | Eaves | 198/460 |
| 4,653,630 | 3/1987 | Bravin | 198/460 |
| 4,770,290 | 9/1988 | Eroskey et al. | 198/847 |
| 4,819,791 | 4/1989 | Melander | 198/818 |
| 5,058,749 | 10/1991 | Jong | 198/415 |
| 5,201,398 | 4/1993 | Clugston | 198/394 |

*Primary Examiner*—Joseph E. Valenza
*Attorney, Agent, or Firm*—Thompson Hine & Flory LLP

[57] ABSTRACT

A product aligning system specially adapted for receiving and aligning product items in bulk quantity, includes a hopper for receiving masses of product items in bulk and including a hopper conveyor extending across the bottom of the hopper, a hopper nose conveyor for receiving product items conveyed by the hopper conveyor and extending outwardly from the hopper, and a scale conveyor for receiving items from the hopper nose conveyor. The hopper nose conveyor and scale conveyor each include powered rakes positioned above the item supporting surfaces of those conveyors such that substantially only a single layer of items passes therebeneath. The hopper nose and scale conveyors each include load sensing apparatus which detects an accumulation of product items on those conveyors and signals a computer control which slows the speeds of the hopper and hopper nose conveyors sufficiently to allow the accumulation of products to reduce. The system also includes a product orienting component which includes an array of V-shaped belts positioned in alternating relation with an array of O-ring belts. The O-ring belts are driven at a slower speed than the V-shaped belts, and further, are driven at varying speeds, so that individual product items which bridge between adjacent O-ring belts, or between a V-shaped belt and an adjacent O-ring belt, are rotated as a result of the speed differential to lay substantially in alignment with the V-shaped product supporting belts. Powered rakes are positioned above the V-shaped belts so that substantially only a single layer of aligned product is conveyed from the downstream ends of the belts.

8 Claims, 7 Drawing Sheets

PRODUCT ALIGNING SYSTEM

BACKGROUND

The present invention relates to product handling systems and, more particularly, to systems for receiving bulk quantities of individual product items and arranging the product items uniformly to be deposited on product conveyors.

In product manufacturing operations, the product items typically are produced in bulk quantities, but in many instances are packed and shipped in packages of a selected number and orientation. This requires that the bulk of product items produced be organized and arranged uniformly so that the items can be placed into packages of a uniform count and orientation.

Typical of such product production operations is the production of cooked products such as frankfurters. Such cooked product items are produced in bulk, yet are packed and shipped in packages of discreet numbers and arrays, such as a package of eight frankfurters, arranged in stacked rows of four frankfurters each.

Accordingly, there is a need for a system for receiving bulk quantities of product items, and ultimately orienting the items uniformly to be placed on conveyors which deliver the items to packing machinery.

SUMMARY OF THE INVENTION

The present invention is a system for receiving bulk quantities of product items and organizing and orienting the items uniformly to be placed on a product conveyor. The product alignment system of the present invention includes a product receiving component, which receives bulk quantities of product, a product orienting component, which receives product items from the receiving component at a measured rate and orients the products uniformly and a product launching component for placing the oriented product items on a bucket conveyor.

The product receiving component includes a hopper shaped to receive bulk quantities of product items. The hopper includes a hopper conveyor which extends across the bed of the conveyor, and a hopper nose conveyor, which projects sidewardly from an open side of the hopper and is fed by the hopper conveyor. The hopper nose conveyor includes a powered rake spaced above its load carrying surface, which spreads out the product items over the surface of the conveyor. The receiving component also includes a scale conveyor, oriented at an angle to the hopper nose conveyor, for receiving product from the hopper nose conveyor and depositing it at a substantially uniform rate onto the product orienting component. The scale conveyor also includes a powered rake spaced above its load carrying surface which provides substantially a continuous, single layer of product.

Both the hopper nose conveyor and the scale conveyor include load sensors at their upstream ends beneath the load carrying surfaces of those conveyors. The load sensors include analog proximity switches and are connected to a computer control and are adjusted to detect an accumulation of product whose weight exceeds a certain preselected level. The accumulation of weight results from the advancement of the hopper conveyor, combined with the action of the powered rakes, which tend to kick product items rearwardly toward the upstream end of the conveyors, while allowing only a single layer or layers of product to pass beneath. When the overload condition is detected by the load sensor associated with the hopper nose conveyor, an analog signal is generated which is read by a computer control which automatically begins to decrease the speed of the motor powering the hopper conveyor, thereby reducing the speed of the conveyor which reduces the rate at which product items are conveyed from the hopper to the hopper nose conveyor. This speed reduction, which is directly proportional to the weight of material on the hopper nose conveyor, continues until the accumulation of product at the upstream end of the hopper nose conveyor is reduced below the threshold level.

Similarly, an accumulation of product items on the upstream end of the scale conveyor triggers the load sensor associated with that conveyor, and generates a signal which is read by the computer control. Consequently, the computer control slows the motor driving the hopper nose conveyor to reduce the rate at which product items are deposited on the upstream end of the scale conveyor. This reduced speed operation, also proportional to the weight of product on the scale conveyor, continues until the amount of product on the scale conveyor is reduced below a threshold amount.

The product orienting component includes a first group of product conveying belts which are made of urethane molded into a V-shape in cross section. The belts are positioned to alternate with a second group of product aligning belts, having an O-ring shape. The product conveying belts are powered to run at a speed which is greater than that of the product aligning belts, so that product items bridging between the product supporting belts and the product aligning belts are rotated into the product supporting belts by the speed differential.

The product aligning belts are powered such that adjacent ones of the product aligning belts run at different speeds, so that product items which may bridge across adjacent aligning belts are rotated to fall into the product supporting belts by the speed differential of the adjacent product aligning belts. Furthermore, the product aligning belts are supported on pulleys which elevate the product contacting surfaces of the product aligning belts above the product support surface of the product supporting belts. Accordingly, there is a tendency for product items to fall downwardly by gravity into the bottom of the V-shaped product supporting belts. The product conveying belt system also includes sets of powered rakes which are spaced above the belts to ensure that only a single layer of product passes beneath.

The product launching component is located downstream of the arrangement of alternating product aligning belts and product supporting belts and includes a group of product launching belts, which also have a V-shape and are in registry with the product conveying belts. In a preferred embodiment, the product launching belts alternate in length so that they will feed evenly a pair of product conveyors which are oriented substantially normal to the direction of travel of the product launching belts.

Accordingly, it is an object of the present invention to provide a product aligning system which is capable of receiving bulk quantities of product items and orienting and aligning the items for placement onto a bucket product conveyor; a product aligning system in which products are automatically fed at an even rate from a hopper onto a product orienting component; a product aligning system which automatically orients oblong product items to lay along product conveying belts; a product aligning system which has a relatively small footprint; and a product aligning system which is relatively easy to maintain and construct.

Other objects and advantages will be apparent from the following description, the accompanying drawings and the appended claims.

DETAILED DESCRIPTION

Figure 1:
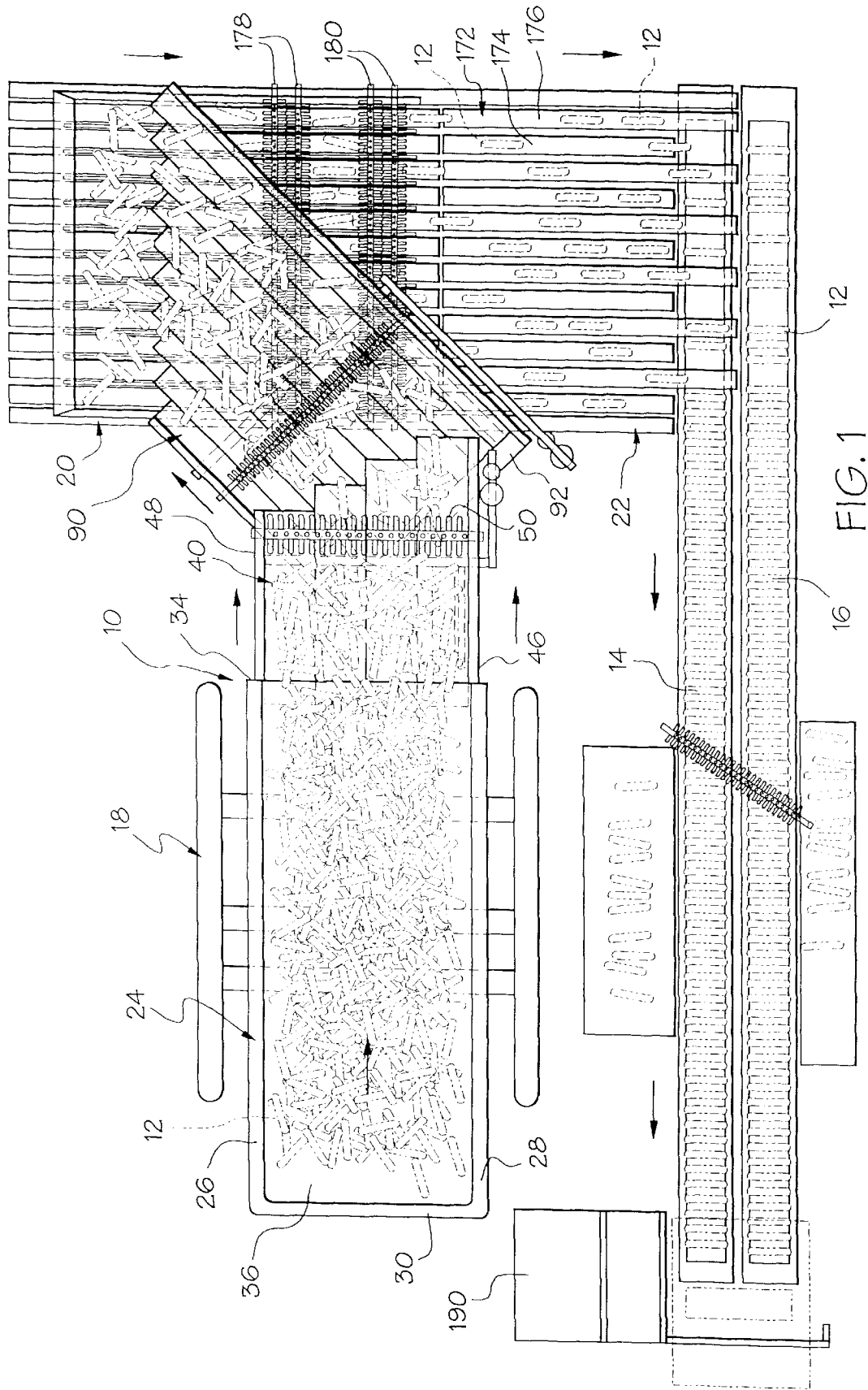
FIG. 1 is a somewhat schematic, top plan view of the product aligning system of the present invention, shown feeding a bucket conveyor.
Figure 2:
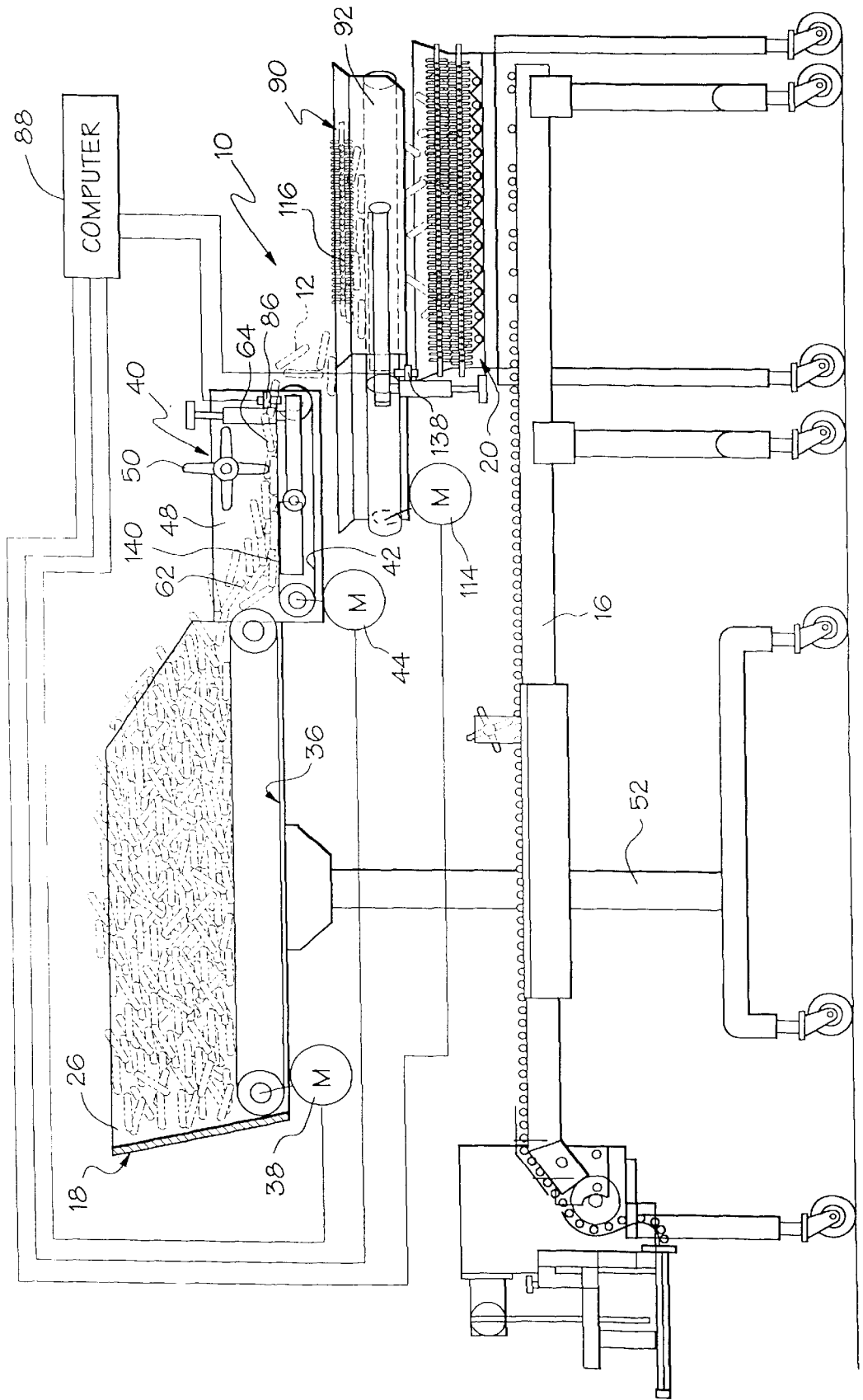
FIG. 2 is a schematic, side elevation of the system shown in FIG. 1.

As shown in FIGS. 1 and 2, the product aligning system of the present invention, generally designated 10, is designed to receive large quantities of product items, such as cooked frankfurters 12, in bulk, and organize and align the frankfurters for placement onto twin bucket conveyors 14, 16. The aligning system includes a product receiving component 18, a product orienting component 20, and a product launching component 22 which ultimately deposits the items 12 on the conveyors 14, 16.

Product Receiving Component

The product receiving component 18 includes a hopper 24 having an open top and bottom, side walls 26, 28, and an end wall 30. The hopper 24 includes an open end 34 and a hopper conveyor 36 driven by AC motor 38. The hopper conveyor 36 extends substantially the entire length of the bottom wall 32 of the hopper 18.

A hopper nose conveyor 40 extends outwardly from the open end 34 of the hopper 18 and inclues a belt assembly 42 driven an AC motor 44. The hopper nose conveyor 40 includes long and short side walls 46, 48 which support a counter-rotating rake 50 driven by motor 44. The hopper nose conveyor 40 and hopper 18 are supported by a wheeled frame 52 so that the entire unit is portable and easily positionable.

Figure 6:
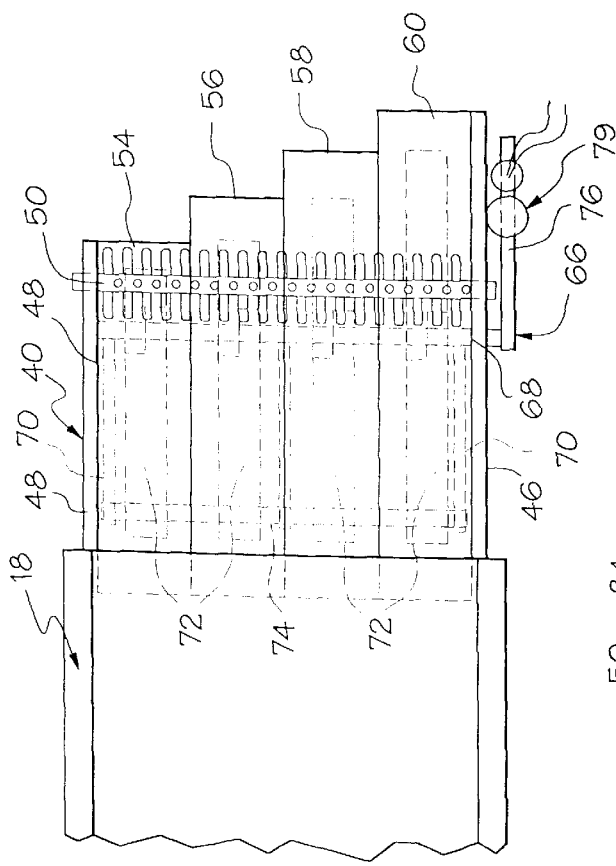
FIG. 6 is a detail showing a top plan view of the hopper nose conveyor of the system of FIG. 1.
Figure 8:
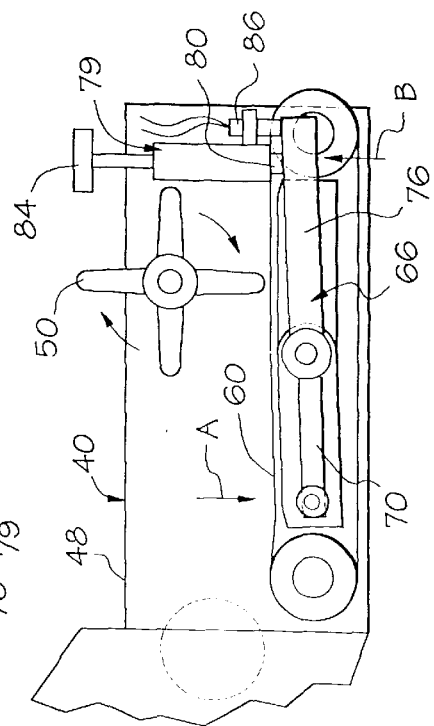
FIG. 8 is a schematic, side elevation of the detail of FIG. 7 in which the load sensor has been actuated.
Figure 7:
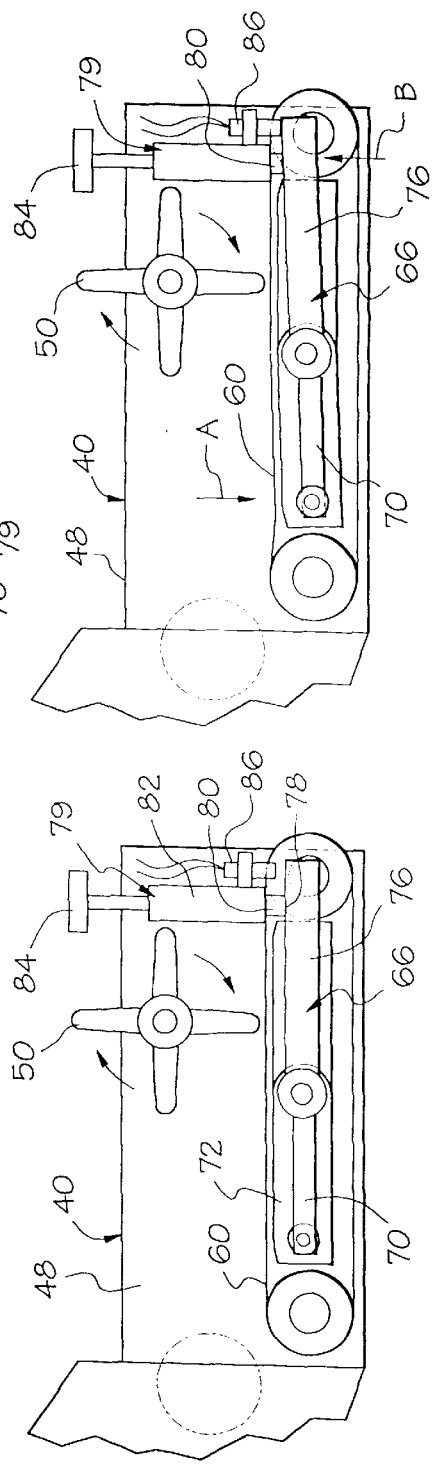
FIG. 7 is a schematic, side elevation of the hopper nose conveyor of FIG. 6.

As shown in FIGS. 6, 7 and 8, the hopper nose conveyor 40 includes conveyor belts 54, 56, 58, 60 positioned adjacent to each other. Belts 54–60 each vary in length in stairstep fashion. The counter-rotating rake 50 is positioned above the belts 54–60 a distance sufficient so that large piles 62 (see FIG. 2) of cooked items deposited on the belts 54–60 are smoothed out so that only a relatively level layer 64 of items passes downstream of the rake. Preferably, rake 50 is oriented substantially normal to the direction of product flow on conveyor 40.

The hopper nose conveyor 40 includes a load sensor shown in FIGS. 6, 7 and 8. The load sensor apparatus, generally designated 66, includes a fulcrum axle 68 which is pivotally mounted in walls 46, 48 and supports upstream lever arm 70 that, in turn, supports load sensor bars 72, which are joined on a common load sensor axle 74 at an upstream end of the conveyors 54–60, and are supported at a downstream end on pivot axle 68. The load sensor 66 also includes a forward lever arm 76 which is displaced outwardly away from the conveyor 60 and includes a contact surface 78 that touches a force adjusting device 79, spring loaded tension button 80 mounted in a sleeve 82. The downward force of the tension button 80 is adjustable by a threaded wheel 84. An analog proximity switch 86 is mounted on the sleeve 82 and, as shown in FIG. 2, is connected to a computer control 88.

As shown in FIGS. 7 and 8, should an accumulation of product items (such as pile 62 shown in FIG. 2) exceed a certain, preselected threshold weight, the downward force of the pile, represented by arrow A in FIG. 8, deflects the contact 72 downwardly, causing the forward lever arm 76 to pivot upwardly in the direction of arrow B, thereby depressing the button 80 and actuating the proximity switch 86, which sends an analog signal to computer control 88 proportional to the weight of the pile 62.

Figure 9:
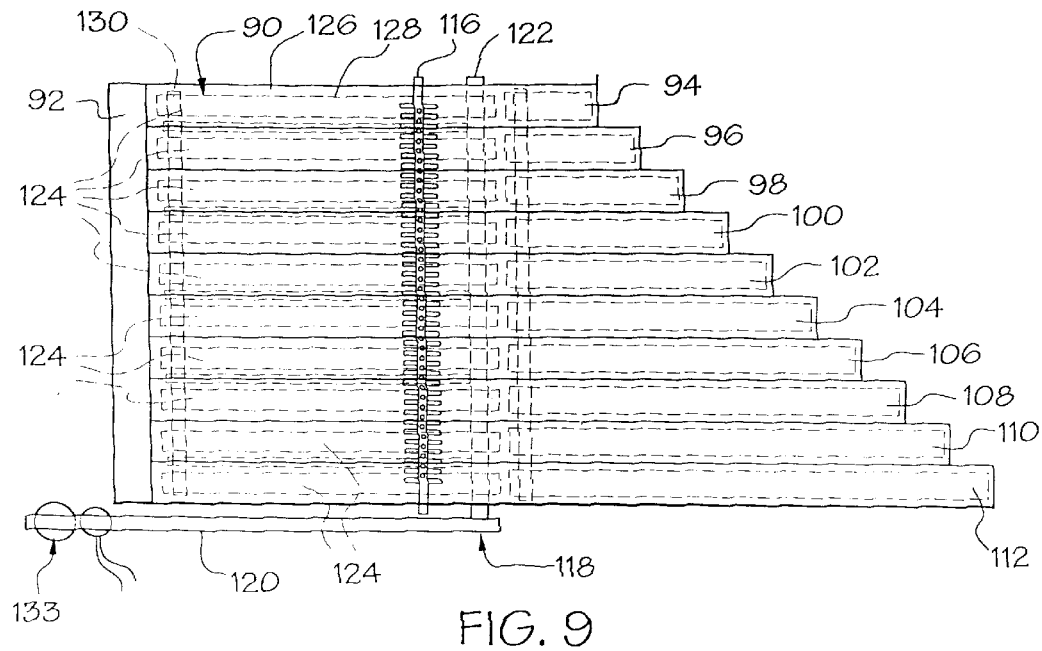
FIG. 9 is a schematic, top plan view of the scale conveyor of the system of FIG. 1.
Figure 10:
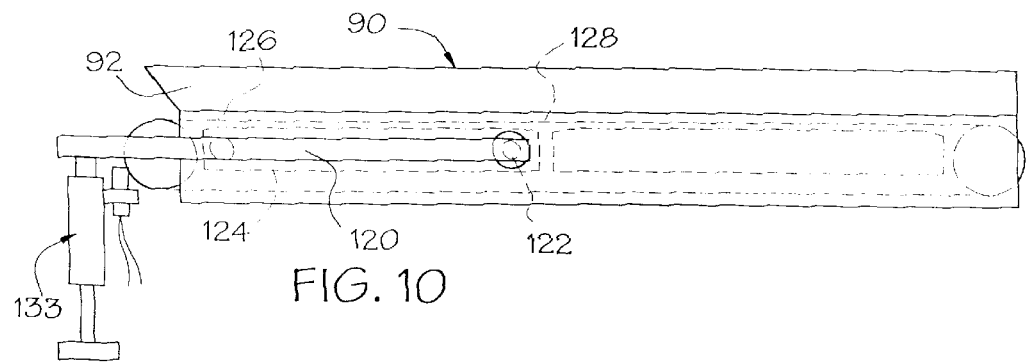
FIG. 10 is a schematic, side elevation of the scale conveyor of FIG. 9.
Figure 11:
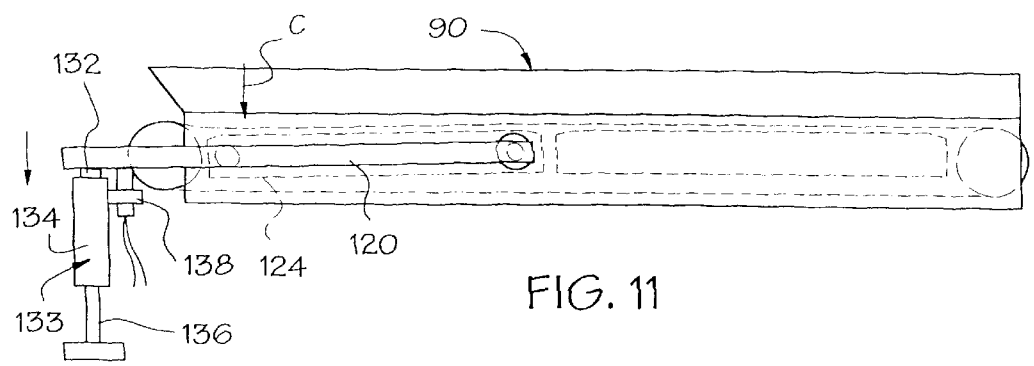
FIG. 11 is a schematic, side elevation of the conveyor of FIG. 10, in which the load sensor is actuated.

The hopper nose conveyor 40 deposits product items 12 onto a scale conveyor, generally designated 90. As shown in FIG. 1, the scale conveyor 90 is oriented at an angle to hopper nose conveyor 40, receives product items 12 from the hopper nose conveyor, and conveys them to the product orienting component 20. The particular angle of the scale conveyor 90 relative to the hopper nose conveyor 40 may be varied to suit the space provided for the aligning system 10. As shown in FIGS. 9, 10 and 11, the scale conveyor 90 includes a hopper 92 which encloses the sides and rear of the conveyor and an array of conveyor elements 94, 96, 98, 100, 102, 104, 106, 108, 110 and 112. The conveyor elements 94–112 are driven by a common AC drive motor 114 which, like motor 44, is actuated by computer control 88. The drive motor 114 also drives a counter-rotating rake 116.

The scale conveyor 90 also includes a load sensor, generally designated 118. Load sensor 118 includes a pivot arm 120 which is attached to a pivot axis 122 supported in the hopper 92 by bearings (not shown). The pivot axis 122 supports lever arms 124 which extend beneath the load carrying surfaces 126 of the belts 128 of the conveyors 94–112. The lever arms 124 are joined by a common lever arm shaft 130 at the upstream end of the conveyors 94–112.

As shown in FIGS. 10 and 11, should the product 12 accumulate on the upstream end of the scale conveyor 90 to a weight which exceeds a predetermined threshold value, the downward force of the weight of the accumulated articles, represented by arrow C, pivots the arms 124 downwardly, thereby pivoting the lever arm 120 downwardly as well. Lever arm 120 depresses the spring-loaded tension button 132 of a force adjusting device 133 similar to that shown in FIG. 7, having a sleeve 134 and force adjusting wheel 136. The proximity of the lever arm 120 to proximity switch 138 generates an analog signal, proportional to the force C, to computer control 88, which is connected to proximity switch 138, as shown in FIG. 2.

The operation of the product receiving component 18 is as follows. Cooked food product items 12 are dumped in bulk into hopper 26, where they are displaced sidewardly (see FIGS. 1 and 2) by hopper conveyor 36 and deposited on the upstream end of the hopper nose conveyor 40. The counter-rotating rake 50, which is powered and in synchronization with motor 44, kicks back product items 12 which are stacked above a predetermined height on the load carrying surface 140 of the conveyor 42. Should the pile 62 of product items accumulating on the upstream end of the conveyor 42 exceed a certain threshold weight, the load sensor 66 will detect the overload condition and signal computer control 88. Computer control 88 will then reduce the speed of motor 38 proportionally to the weight of pile 62, which controls conveyor 36 to slow the rate of product flow from the hopper 26 to the hopper nose conveyor 40.

The hopper nose conveyor will, nevertheless, continue to deposit cooked product items 12 on the scale conveyor 90, evenly distributing the product across conveyor elements 94–112. The counter-rotating rake 116 of scale conveyor 90 kicks back cooked items so that substantially a single layer of cooked items flows downstream of the rake 116 to the product aligning component 22. Should the product items accumulate in the upstream portion of the scale conveyor 90 above a predetermined weight, the load sensor 118 will detect the overload condition and signal computer control 88. Computer control 88 will slow down hopper nose conveyor drive motor proportionally to the weight of the pile until the condition is corrected, with the weight of accumulated product items falling below the threshold level. Consequently, the need for operator supervision of these components is substantially reduced, as is the need for operator intervention in preventing overload conditions.

Product Orienting Component

Figure 12:
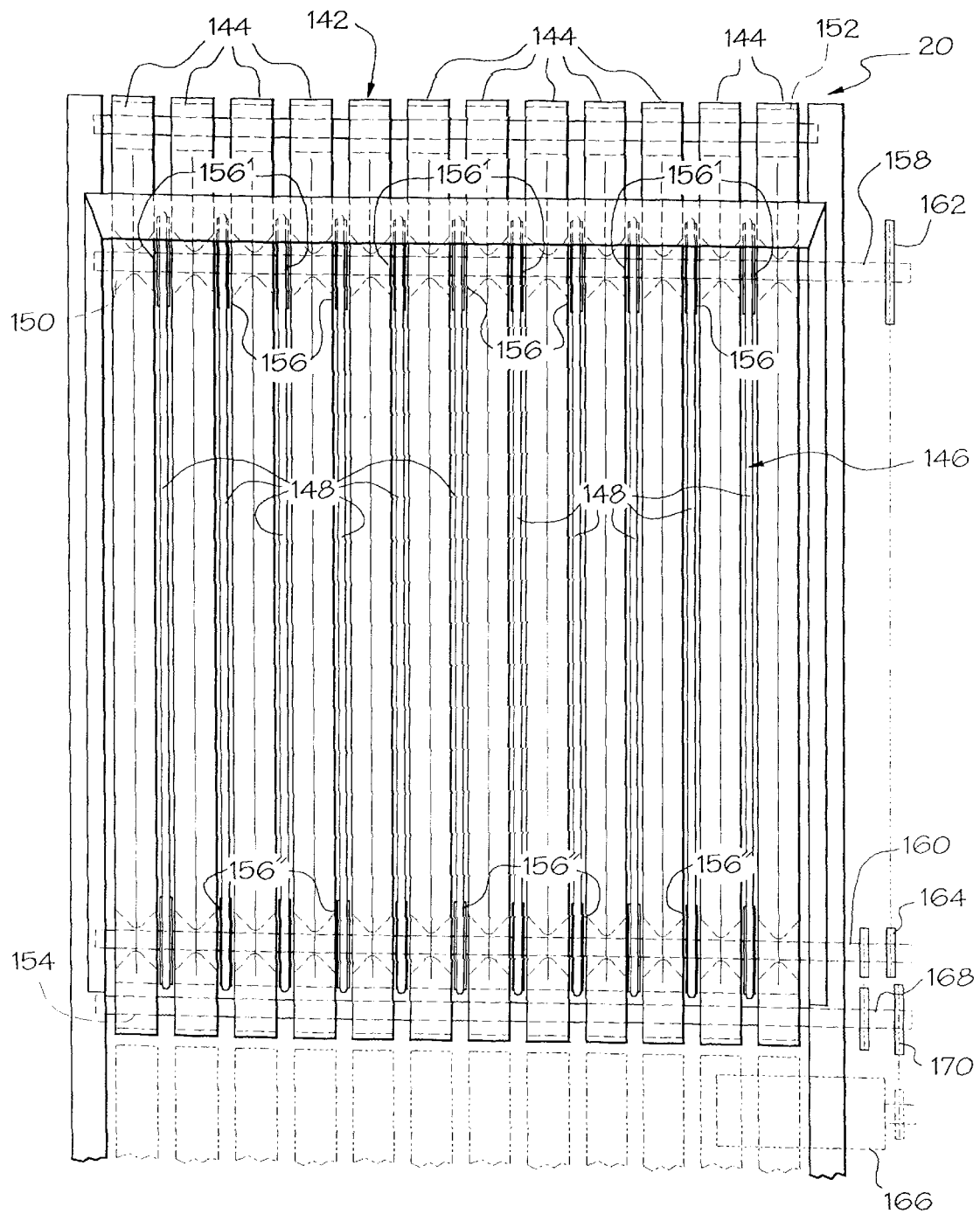
FIG. 12 is a top plan view of the upstream portion of the product launcher apparatus of the system of FIG. 1.

The product orienting component 20 is shown in FIGS. 1 and 12 and includes an array 142 of product conveying belts 144 and an array 146 of product aligning belts 148. The product aligning belts 148 are O-ring belts and are oriented in alternating relation with the product conveying belts 144.

Figure 4:
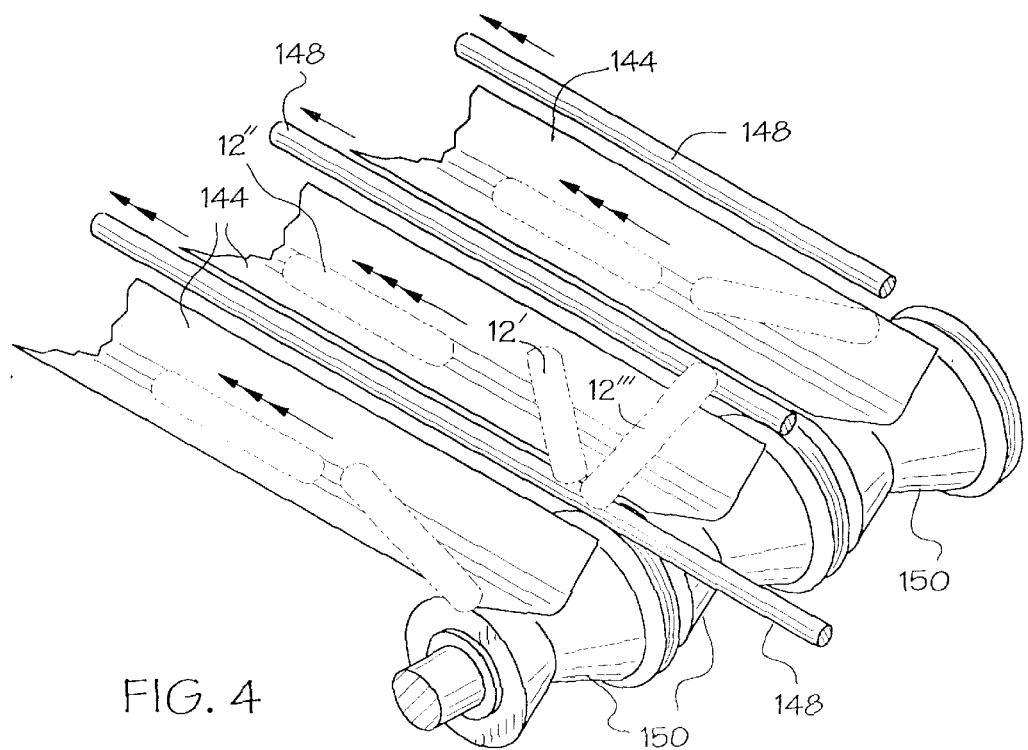
FIG. 4 is a detail showing the product supporting belts and product aligning belts of the system of FIG. 1.
Figure 5:
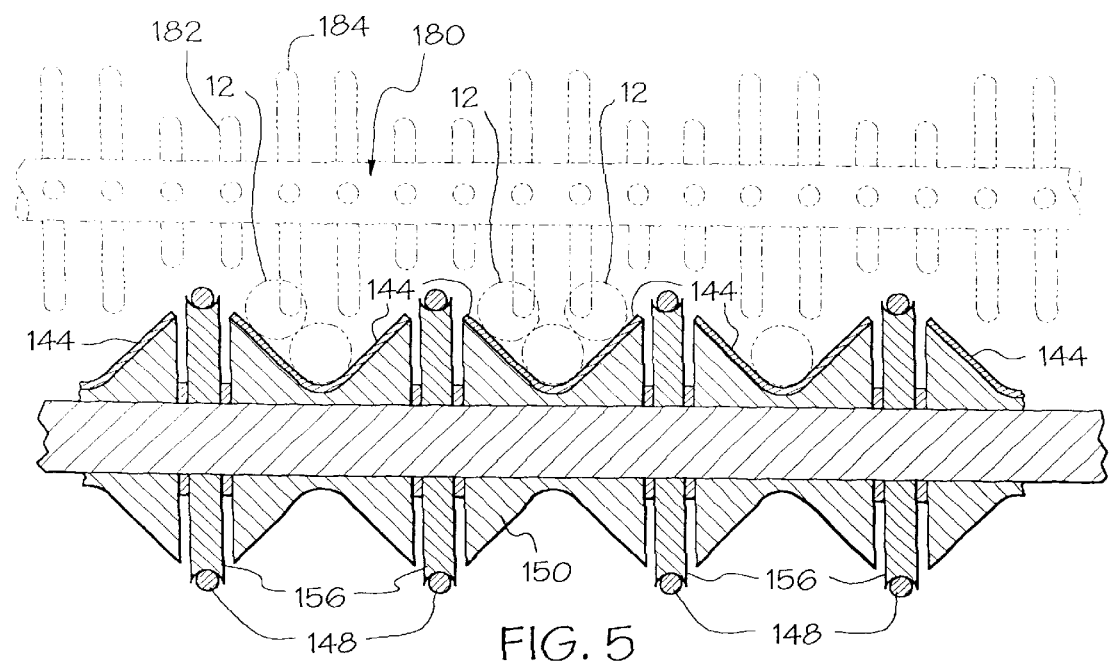
FIG. 5 is a detail in section of the pulleys supporting the product supporting belts and product aligning belts shown in FIG. 4.

The product conveying belts 144 are made of urethane and, as shown in FIGS. 4 and 5, are molded to have a V-shape. The belts 144 are supported on intermediate conveyor rollers 150 (see also FIG. 12) which are formed to have a V-shape complementary to the belts 144. The upstream and downstream end rollers 152, 154, however, are standard crowned rollers, so that the belts 144 are self-aligning despite their V-shape. The product aligning belts 148 are mounted on pulleys 156. The upstream end of the product aligning belts 148 is supported on upstream axle 158, and the downstream end of the product aligning belts are mounted on downstream axle 160. Axles 158, 160 also support intermediate rollers 150 of the product conveying belts 144, which rotate freely on axles 158, 160.

Upstream support rollers 156' are ridgedly fixed to the axle 158, while the rollers 156 intermediate these rollers are not, and therefore rotate freely on the axle. Conversely, rollers 156" are ridgedly mounted on axle 160 directly downstream of rollers 156, and therefore are alternating with rollers 156 which are supported on, but not attached and driven by, axle 160. Axle 158 is driven by drive sprocket 162, which is of a larger diameter than drive sprocket 164 on axle 160. Both sprockets 162, 164 are driven by conveyor drive motor 166, so that the drive rollers 156' are, at all times, driven at a speed which is less than the speed of drive rollers 156". This ensures that, at all times, the belts 148 are travel at different speeds so that there is a differential in belt speed between any two adjacent ones of the belts 148. Further, the drive axis 168 for the product conveying belts 144 is also driven by motor 166, and the drive sprocket 170 is sized such that the speed of belts 144 at all times exceeds the speeds of belts 148.

As shown in FIG. 4, should a product item 12' bridge a product conveying 144 and an adjacent product aligning belt 148, the speed differential between the belts 144, 148 will cause the product to rotate and align itself to the position shown as 12", in which the product lies in the crotch or lower portion of the V-shaped belt. Should a product 12''' bridge between two adjacent product aligning belts 148, as shown in FIG. 4, the speed differential between those two belts will also cause the item to rotate, first to the position shown as 12', then ultimately to the orientation shown as 12". In order to accomplish this aligning task, it is preferable that the diameters of the pulleys 156 be greater than the greatest diameter of the rollers 150. With such dimensioning, the rotation of product items 12 to the orientation shown as 12" is aided by gravity.

Product Launching Component

As shown in FIG. 1, a product launching component 22 is positioned immediately downstream from the product aligning component 20, and comprises an array 172 of product launching belts 174, 176. Belts 174, 176 are urethane belts molded to form a V-shape, identical to that shown in FIGS. 4 and 5. Further, the extreme upstream and downstream end rollers (not shown) are also crowned, as with rollers 152, 154, so that the conveyors perform a self-aligning function.

The belts 174 terminate a shorter distance than belts 176, and are oriented in alternating relation with belts 176. With this orientation, product items 12 are loaded evenly onto conveyors 14, 16, even if the product is not distributed evenly across the component 22. The belts 174, 176 are powered by drive motor 166, and therefore are synchronized in speed with the belts 144. Belts 174, 176 convey the food product items 12 (best shown in FIG. 1) to the conveyors 14, 16 and the speed of the belts 174, 176 is sufficient to "launch" the products to fall into transfer buckets (not shown) of the conveyors 14, 16 so that product 12 is oriented in transverse, parallel relation as it travels down conveyors 14, 16.

In order to prevent an orientation of product in which the items 12 are stacked more than one high on the belts 144, a series of counter-rotating rakes 178, 180 is provided. As shown in FIG. 5, rakes 178, 180 are provided with fingers 182 which are shorter than fingers 184 to accommodate the variation elevation of the product supporting surfaces and product contacting surfaces of the product conveying belts 144 and product aligning belts 148.

As shown in FIG. 5, the fingers 184 of the rakes 178, 180 kick back product items 12 that may tend to accumulate in layers more than one product item high.

System Operation

The operation of the system 10 is as follows. The computer control 88 is powered up by the operator, and the motors 38, 44, 114 and 166 are activated. A bulk load of product 12 is dumped into the hopper 26 and is conveyed sidewardly (see FIG. 1) onto hopper nose conveyor 40. The rake 50 of hopper nose conveyor 40 levels out the product 12 and prevents lumps and piles of product from depositing onto the scale conveyor 90. Product deposited on scale conveyor 90 is likewise conveyed downstream to the upstream end of the product aligning conveyor 20. Should an accumulation of product 12 build up on hopper nose conveyor 40, the load sensor 66 will detect the condition, analog proximity switch 86 will signal computer control 88, and the speed of motor 38 will vary accordingly, speeding up or slowing down gradually to ensure an even flow of product.

Similarly, should product accumulate on the upstream end of scale conveyor 90, the analog proximity switch 138 will signal the computer 88 to vary the speed of motor 44 accordingly. If necessary, the speed of motor 38 will be varied, depending whether the slowdown of motor 44 causes an excessive build-up of product 62. Therefore, the leveling system has a cascade effect in which the speed of motor 144 determines, indirectly, the speeds of drive motors 44 and 38, and therefore the speeds of their associated hopper nose conveyor 42 and hopper conveyor 36.

The product items 12 are deposited onto the upstream end of product aligning component 20, where it falls in disorganized fashion on belts 144 and 148. As described previously, the differentials in speeds between belts 144 and 148, and between adjacent ones of 148, cause the product items 12 to rotate and orient themselves in the crotches of the V-belts 144. Excessive layers of such aligned products are removed as the V-belts 144 convey products have passed the powered rake assemblies 178, 180. The aligned products are then deposited onto the launching component 122, and are conveyed to the bucket conveyors 14, 16 which, in turn, convey the product 12 to packing apparatus, shown in FIG. 1 generally as 190. The packing apparatus 190 includes a filler head which is shown and described in copending application Ser. No. 08/532,221 (attorney docket 024793.501), the disclosure of which is incorporated herein by reference.

Accordingly, the product aligning system 10 of the present invention provides a compact, efficient and automated system for receiving product items in bulk, metering the flow of product items onto a product item orienting and aligning component, then depositing the aligned product items onto a bucket conveyor for further handling. By providing a closed loop, computer-controlled metering system, the wide variations in product flow into the hopper are accommodated by varying the speeds of the several conveyors that convey the product to the aligning apparatus.

Figure 3:
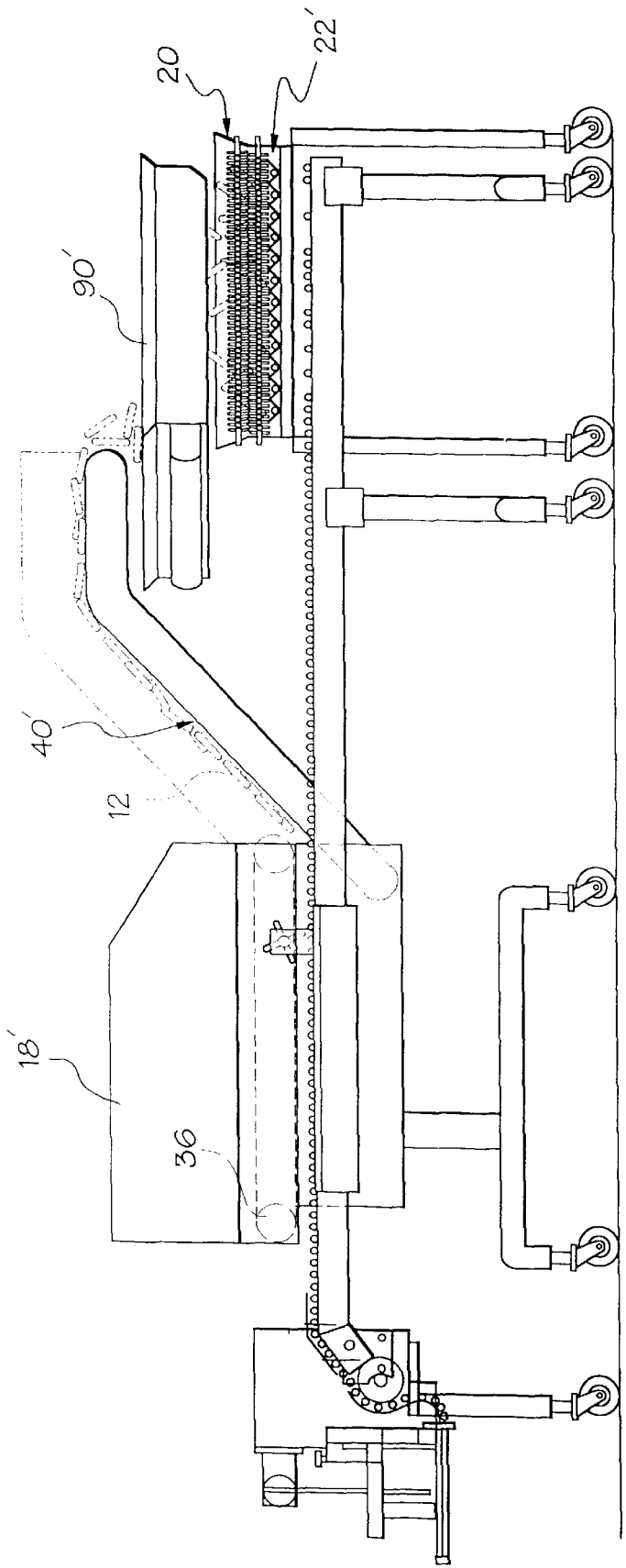
FIG. 3 is a schematic, side elevation of an alternate embodiment of the present invention.

An alternate embodiment of the present invention is shown in FIG. 3, in which a hopper 18' includes a hopper conveyor 36' which is positioned below the hopper (not shown) of the scale conveyor 90'. The scale conveyor 90' is substantially identical in construction to the conveyors 94–112 of the embodiment of FIG. 1. The hopper nose conveyor 40' has been modified to convey the product items 12 upwardly from the hopper conveyor 36 to the scale conveyor. Consequently, it is not necessary to include load sensing apparatus in the hopper nose conveyor 40'. The product aligning component 20' and product launching component 22' of the embodiment of FIG. 2 are substantially identical to their counterparts in the embodiment of FIG. 1.

While the forms of apparatus herein described constitute preferred embodiments of the invention, it is to be understood that the present invention is not limited to these precise forms of apparatus, and that variations may be made without departing from the scope of the invention.

What is claimed is:

1. A product aligning system comprising:
a first conveyor including a plurality of product supporting belts;
a second conveyor including a plurality of alignment belts interposed between said plurality of product supporting belts, said product supporting belts being positioned in alternating relation with said alignment belts; and
a drive motor connected to drive said alignment belts at a speed different than that of said product supporting belts such that a product item deposited on said system such that said item bridges one of said product supporting belts and one of said alignment belts is rotated to lay along said one product supporting belt by a differential in said speeds of said one product supporting belt and said one alignment belt;
said second conveyor including a product contacting surface, and said first conveyor including a product supporting surface, said product contacting surface being positioned at an elevation greater than said product supporting surface such that said product items bridging between said product contacting surface and said product supporting surface tend to fall substantially completely upon said product supporting surface;
said drive motor drives adjacent ones of said alignment belts at different speeds, such that a product item bridging between said adjacent alignment belts is rotated to fall downwardly onto an intermediate one of said product supporting surfaces of one of said product supporting belts;
said second conveyor including an upstream axle having pulleys for supporting an upstream end of said alignment belts, and a downstream axle having pulleys for supporting a downstream end of said alignment belts, said upstream axle being connected to said drive motor to be driven at a first speed, said downstream axle being connected to said drive motor to be driven at a second speed different than said first speed;
a first group of said upstream pulleys being connected to be driven by said upstream axle and a second group of said upstream pulleys not being connected to be driven by said upstream axle, said first and second groups of pulleys being arranged on said upstream axle in alternating relation;
a first group of said downstream pulleys not being connected to be driven by said downstream axle and a second group of said downstream pulleys being connected to be driven by said downstream axle, said first and second groups of pulleys being arranged on said downstream axle in alternating relation such that said first groups of said upstream and downstream pulleys are paired to support common ones of said alignment belts; and
said second groups of said upstream and downstream pulleys being paired to support common ones of said alignment belts.

2. A product aligning system comprising:
a first conveyor including a plurality of product supporting belts;
a second conveyor including a plurality of alignment belts interposed between said plurality of product supporting belts;
a drive motor connected to drive said alignment belts at a speed different than that of said product supporting belts such that a product item deposited on said system such that said item bridges one of said product supporting belts and one of said alignment belts is rotated to lay along said one product supporting belt by a differential in said speeds of said one product supporting belt and said one alignment belt;
a product launching conveyor positioned to receive aligned product items from said first conveyor, said product launching conveyor including a plurality of product launching belts, said product launching belts being positioned in registry with said product supporting belts to receive aligned product items therefrom; and a rake assembly positioned above said first conveyor at a downstream end thereof and oriented substantially normal to a direction of travel of said first conveyor, such that only a single level of product items are permitted to pass therebeneath;

said product launching belts alternating in length such that downstream ends thereof terminate at first and second transverse positions so that two product receiving belts, oriented substantially normal to said product launching belts, each receive product items substantially evenly.

3. A product aligning system comprising:

a first conveyor including a plurality of product supporting belts, said product supporting belts including a product supporting surface;

a second conveyor including a plurality of alignment belts interposed in an alternating relation between said plurality of product supporting belts, said alignment belts including a product contacting surface positioned at an elevation greater than said product supporting surface such that said product items bridging between said product contacting surface and said product supporting surface tend to fall substantially completely upon said product supporting surface;

a drive motor connected to drive said alignment belts at a speed different than that of said product supporting belts such that a product item deposited on said system such that said item bridges one of said product supporting belts and one of said alignment belts is rotated to lay along said one product supporting belt by a differential in said speeds of said one product supporting belt and said one alignment belt; and a rake assembly positioned above said first and second conveyors and oriented substantially normal to a direction of travel of said first conveyor and second conveyors, said rake assembly including a first set of fingers positioned over said product supporting surface and a second set of fingers positioned over said product contacting surface, said first set of fingers being longer than said second set of fingers to respectively correspond with said elevation of said product supporting surface and said elevation of said product contacting surface so as to only allow a single level of product items to pass beneath said first and second sets of fingers.

4. A product aligning system comprising:

a first conveyor including a plurality of product supporting belts, said product supporting belts having a V-shaped cross section;

a second conveyor including a plurality of alignment belts interposed between said plurality of product supporting belts;

a drive motor connected to drive said alignment belts at a speed different than that of said product supporting belts such that a product item deposited on said system such that said item bridges one of said product supporting belts and one of said alignment belts is rotated to lay along said one product supporting belt by a differential in said speeds of said one product supporting belt and said one alignment belt.

5. The system of claim 4 wherein said product supporting belts are molded of a single, continuous strip of urethane formed to have a V-shape.

6. The system of claim 2 wherein said product supporting belts and said product launching belts are V-shaped in cross section.

7. The system of claim 6 wherein said product supporting belts and said product launching belts are made of urethane.

8. The system of claim 7 wherein said product supporting belts and said product launching belts are molded of a single, continuous strip of urethane formed to have a V-shape.

* * * * *